US012811646B2

(12) United States Patent
Yuan et al.

(10) Patent No.: US 12,811,646 B2
(45) Date of Patent: Nov. 24, 2026

(54) USER EQUIPMENT CAPABILITY REPORTING FOR JOINT DOWNLINK AND UPLINK BEAM REPORTS

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/273,706

(22) PCT Filed: Mar. 31, 2021

(86) PCT No.: PCT/CN2021/084366
§ 371 (c)(1),
(2) Date: Jul. 21, 2023

(87) PCT Pub. No.: WO2022/205056
PCT Pub. Date: Oct. 6, 2022

(65) Prior Publication Data
US 2024/0097763 A1 Mar. 21, 2024

(51) Int. Cl.
*H04B 7/06* (2006.01)
*H04L 5/00* (2006.01)
*H04W 24/10* (2009.01)

(52) U.S. Cl.
CPC ......... *H04B 7/0626* (2013.01); *H04L 5/0048* (2013.01); *H04W 24/10* (2013.01)

(58) Field of Classification Search
CPC .. H04B 7/0626; H04B 7/0404; H04B 7/0628; H04B 7/069; H04L 5/0048; H04W 24/10
See application file for complete search history.

(56) References Cited

U.S. PATENT DOCUMENTS 12,238,700 B2 * 2/2025 Gao ..................... H04B 7/0404
2019/0159219 A1 * 5/2019 Hosseini ............... H04W 72/56
(Continued)

FOREIGN PATENT DOCUMENTS

WO 2020156492 A1 8/2020
WO 2020168130 A1 8/2020
(Continued)

OTHER PUBLICATIONS

Ad-Hoc Chair (Samsung): "Session notes for 8.1 (Further enhancements on MIMO for NR)", 3GPP TSG RAN WG1 Meeting #104-e, R1-2102250, Feb. 5, 2021 (Feb. 5, 2021), 20 Pages, The Whole Document.

(Continued)

*Primary Examiner* — Habte Mered
(74) *Attorney, Agent, or Firm* — Arent Fox Schiff LLP

(57) ABSTRACT

This disclosure provides systems, methods and apparatus, including computer programs encoded on computer storage media, for a user equipment (UE) to transmit a joint channel state information (CSI) report for both uplink beams and downlink beams and for a base station (BS) to receive the joint CSI report. The BS may configure the UE to measure metrics based on CSI reference signals (RS) or synchronization signal blocks (SSB). The UE may measure the CSI-RS or SSB to determine CSI metrics including at least one downlink metric and at least one uplink metric for at least one set of uplink panel identifiers (IDs). The UE may transmit the joint CSI report including the at least one downlink metric, the at least one uplink metric, and the set of uplink panel IDs associated with the at least one uplink metric.

18 Claims, 9 Drawing Sheets

(56) References Cited

U.S. PATENT DOCUMENTS

| | | | | |
|---|---|---|---|---|
| 2020/0259625 | A1* | 8/2020 | Papasakellariou | H04B 7/0632 |
| 2021/0384955 | A1* | 12/2021 | Varatharaajan | H04L 5/0048 |
| 2022/0166468 | A1* | 5/2022 | Go | H04B 7/06956 |
| 2022/0394504 | A1* | 12/2022 | Guan | H04L 5/0051 |
| 2023/0041095 | A1* | 2/2023 | Zhou | H04B 7/0619 |
| 2023/0300940 | A1* | 9/2023 | Jang | H04L 5/00 370/329 |
| 2023/0379843 | A1* | 11/2023 | Go | H04W 52/365 |
| 2024/0032057 | A1* | 1/2024 | Oh | H04W 72/231 |
| 2024/0072865 | A1* | 2/2024 | Khan Beigi | H04L 25/0228 |
| 2024/0097762 | A1* | 3/2024 | Kyung | H04B 7/024 |

FOREIGN PATENT DOCUMENTS

| | | | | |
|---|---|---|---|---|
| WO | 2020258132 | A1 | 12/2020 | |
| WO | WO-2022201551 | A1 * | 9/2022 | H04W 24/10 |

OTHER PUBLICATIONS

International Search Report and Written Opinion—PCT/CN2021/084366—ISA/CN—Dec. 30, 2021.

Moderator (Samsung): “Moderator Summary#5 for Multi-beam Enhancement: Round 3”, 3GPP TSG RAN WG1 Meeting #104-e, R1-2102054, Feb. 5, 2021 (Feb. 5, 2021), 30 Pages, The Whole Document.

* cited by examiner

USER EQUIPMENT CAPABILITY REPORTING FOR JOINT DOWNLINK AND UPLINK BEAM REPORTS

CROSS-REFERENCE TO RELATED APPLICATIONS

This application is a 35 U.S.C. § 371 National Phase Application of PCT Application No. PCT/CN2021/084366 filed Mar. 31, 2021, entitled "USER EQUIPMENT CAPABILITY REPORTING FOR JOINT DOWNLINK AND UPLINK BEAM REPORTS," which is assigned to the assignee hereof and hereby incorporated by reference herein.

TECHNICAL FIELD

The present disclosure relates to user equipment (UE) capability reporting for joint downlink (DL) and uplink (UL) beam reports.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include receiving channel state information (CSI) reference signals (RS). The method may include measuring CSI metrics based on the CSI-RS, the CSI metrics including at least one downlink metric and at least one uplink metric for at least one set of uplink panel identifiers (IDs). The method may include transmitting a joint CSI report including the at least one downlink metric, the at least one uplink metric, and the set of uplink panel IDs associated with the at least one uplink metric.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a base station (BS). The method may include configuring a user equipment (UE) to measure channel state information (CSI) metrics based on CSI reference signals (RS), the CSI metrics including at least one downlink metric and at least one uplink metric for at least one set of uplink panel identifiers (IDs). The method may include transmitting the CSI-RS. The method may include receiving a joint CSI report from the UE including the at least one downlink metric, the at least one uplink metric, and the at least one set of uplink panel IDs associated with the at least one uplink metric.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
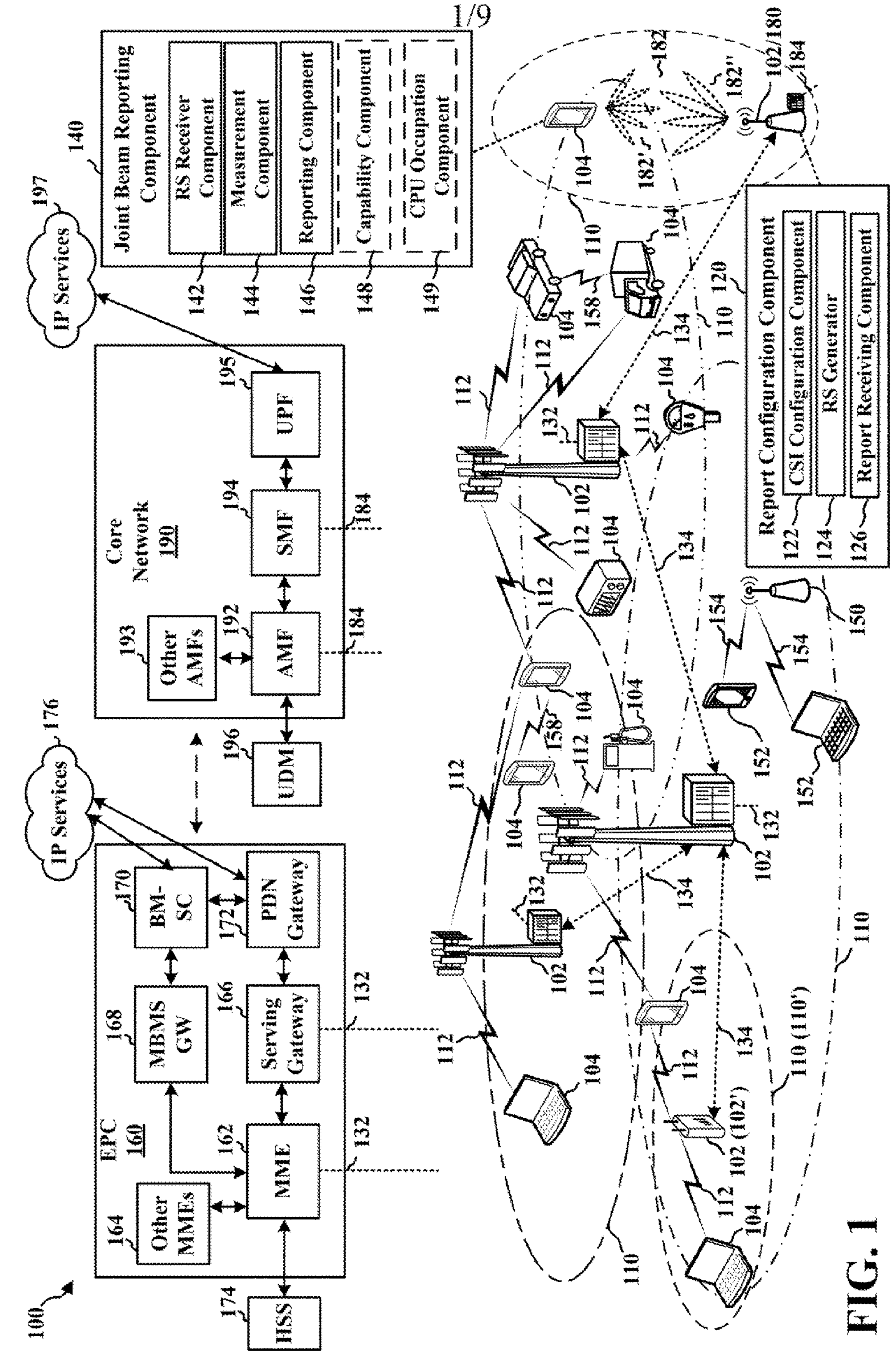
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) and a base station (BS) may transmit reference signals (RS) to one another in order for the other device to estimate an appropriate communication channel and perform measurements. In one example, the BS may transmit a channel state information (CSI)-RS to a UE or transmit a synchronization signal block (SSB). The UE may use the CSI-RS and/or the SSB to measure a channel quality indicator (CQI) such as a reference signal received power (RSRP) or a signal to interference plus noise ratio (SINR). The CQI may be used for beam measurement and reporting. For example, the BS may configure the UE to measure a CQI for different groups of transmit-receive points (TRPs) and/or different beams. The UE may report the CQI in one or more CQI reports.

One approach to improving communications between the UE and the BS is uplink (UL) panel selection. The UE may include multiple antennas that are arranged into groups that may be referred to as panels. Selection of panels for UL transmissions may be used to mitigate maximum permissible exposure (MPE). For example, the UE may select panels to comply with an MPE limit. Other possibilities for UL panel selection include UE power saving and UL interference management. In some cases, the different panels may have different configurations and/or be used for different purposes. In some cases, the multiple panels may act as different TRPs for UL transmissions. To facilitate fast UL panel selection and MPE mitigation, the UL transmit panels may be assumed to be a same set or a subset of downlink (DL) receive panels.

In some proposals for UL panel selection, the UE may select an UL panel. In other aspects of wireless communications, however, the BS typically makes decisions and configures the UE. Accordingly, it may be desirable for the BS to select UL panels, at least in some cases. Therefore, it may also be desirable to provide the BS with beam information about channel conditions for the UL panels in order for the BS to select a set of UL panels.

In an aspect, the present disclosure provides for a joint CSI report that includes both DL information and UL information. For example, the joint CSI report may include at least one DL metric and at least one UL metric for a set of panels. It may be possible for the UE to report UL metrics for different panels or sets of panels (e.g., different subsets of the DL panels). For example, the UE may measure the CSI-RS from the BS using each panel and estimate an UL channel metric based on an assumption that the UL channel conditions are similar to the DL channel conditions. The UE, however, may be constrained in a number of UL panels that can be concurrently measured and/or reported, for example due to hardware processing limits. In some implementations, the UE may report a capability of the UE regarding a maximum number of panels or panel sets for which UL metrics can be reported. In another aspect, determining the UL metric may utilize CSI processing unit (CPU) resources that are also used for determining the DL metric. The UE and the BS may determine that at least one CPU is occupied for reporting the UL metrics. Accordingly, the BS may configure the UE with CSI reports such that the UE has sufficient CPUs to generate the configured CSI reports.

Particular implementations of the subject matter described in this disclosure can be implemented to realize one or more of the following potential advantages. The joint CSI report including both DL and UL metrics may allow the BS to select an UL panel. Selection of the UL panel by the BS may improve signal quality at the BS and/or reduce interference at the BS or other network nodes. Configuration of the joint CSI report based on UE capabilities may ensure that the UE is able to generate and transmit the configured reports. Similarly, counting UL metrics towards CPU occupation may allow more efficient utilization of the CPU resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

In some implementations, one or more of the UEs 104 may include a joint beam reporting component 140 that generates a joint CSI report that includes both DL beam information and UL beam information. The joint beam reporting component 140 may include a RS receiver component 142 configured to receive CSI-RS. The joint beam reporting component 140 may include a measurement component 144 configured to measure CSI metrics based on the CSI-RS. The CSI metrics may include at least one DL metric and at least one UL metric for at least one set of UL panel IDs. The joint beam reporting component 140 may include a reporting component 146 configured to transmit a joint CSI report including the at least one DL metric, the at least one UL metric, and the set of UL panel IDs associated with the at least one UL metric. In some implementations, the joint beam reporting component 140 may optionally include a capability component 148 configured to transmit an indication of a capability to support CSI reporting for a maximum number of sets of UL panel IDs. In some implementations, the joint beam reporting component 140 may optionally include a CPU occupation component 149 configured to determine that at least one CPU is occupied for reporting the at least one UL metric.

In some implementations, one or more of the base stations 102 may include a report configuration component 120 configured to configure and receive a joint CSI report from a UE. The report configuration component 120 may include a CSI configuration component 122 configured to configure a UE to measure CSI metrics based on CSI-RS and/or SSBs. The CSI metrics may include at least one DL metric and at least one UL metric for at least one set of UL panel IDs. The report configuration component 120 may include a RS generator 124 configured to transmit reference signals (e.g., the CSI-RS). The report configuration component 120 may include a report receiving component 126 configured to receive a joint CSI report from the UE including the at least one DL metric, the at least one UL metric, and the at least one set of UL panel IDs associated with the at least one UL metric.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figure 2A:
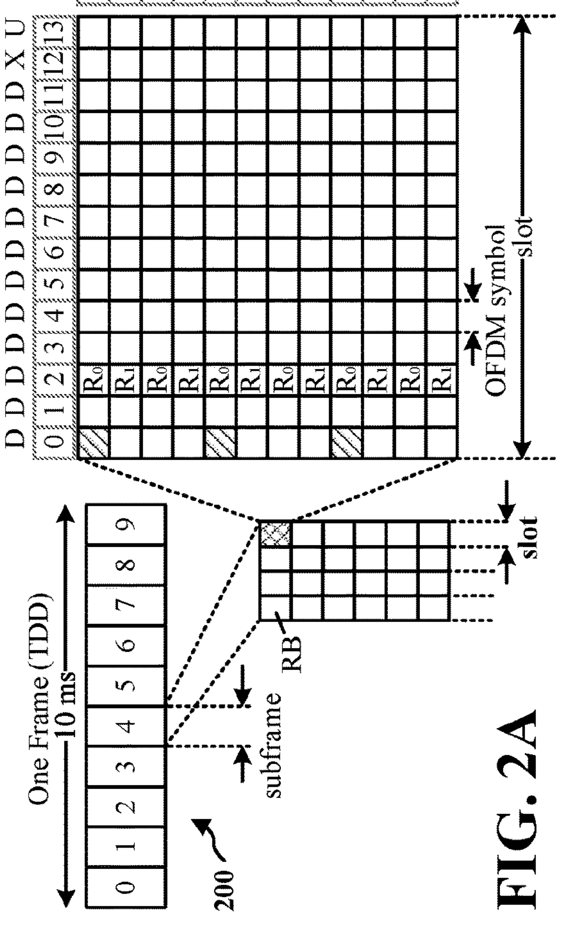
FIG. 2A is a diagram illustrating an example of a first frame.
Figure 2B:
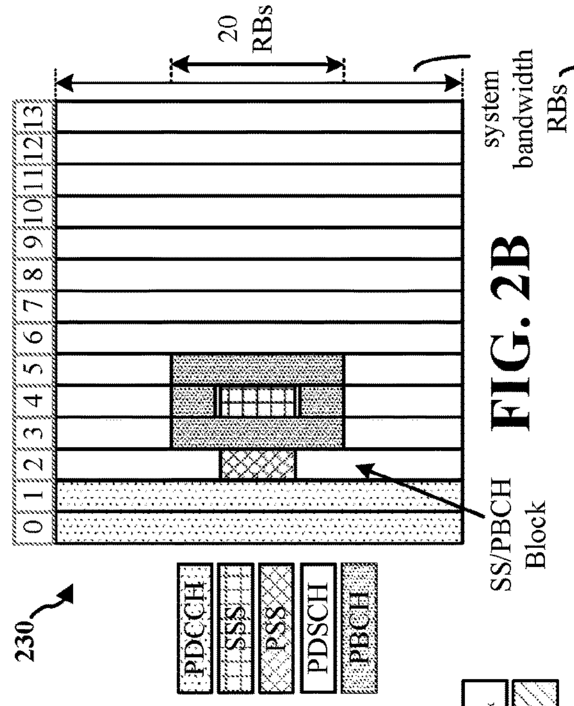
FIG. 2B is a diagram illustrating an example of DL channels within a subframe.
Figure 2C:
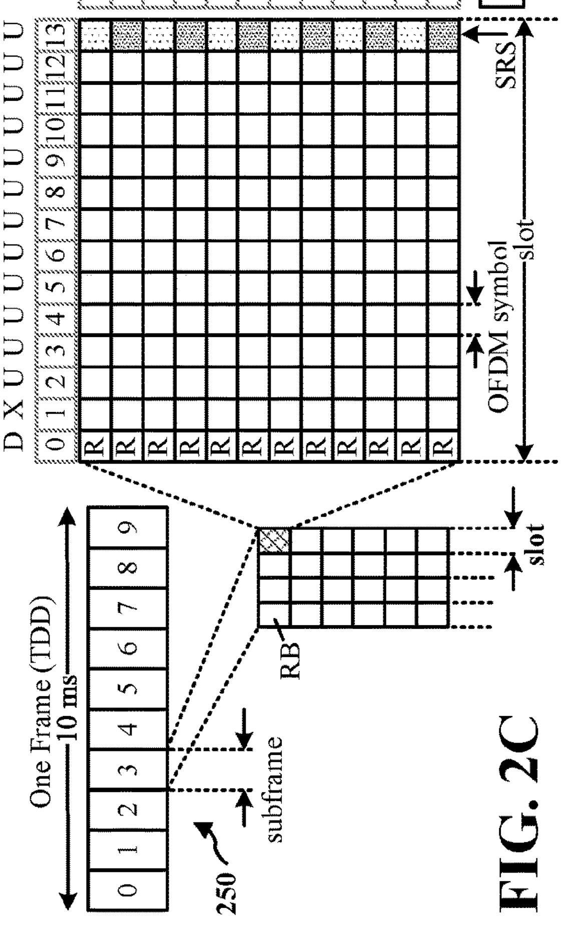
FIG. 2C is a diagram illustrating an example of a second frame.
Figure 2D:
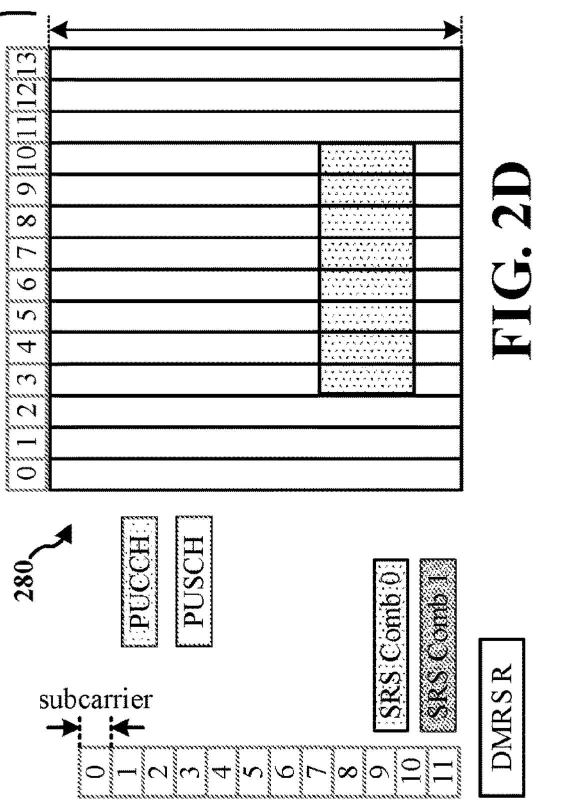
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds (μs).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100*x* is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
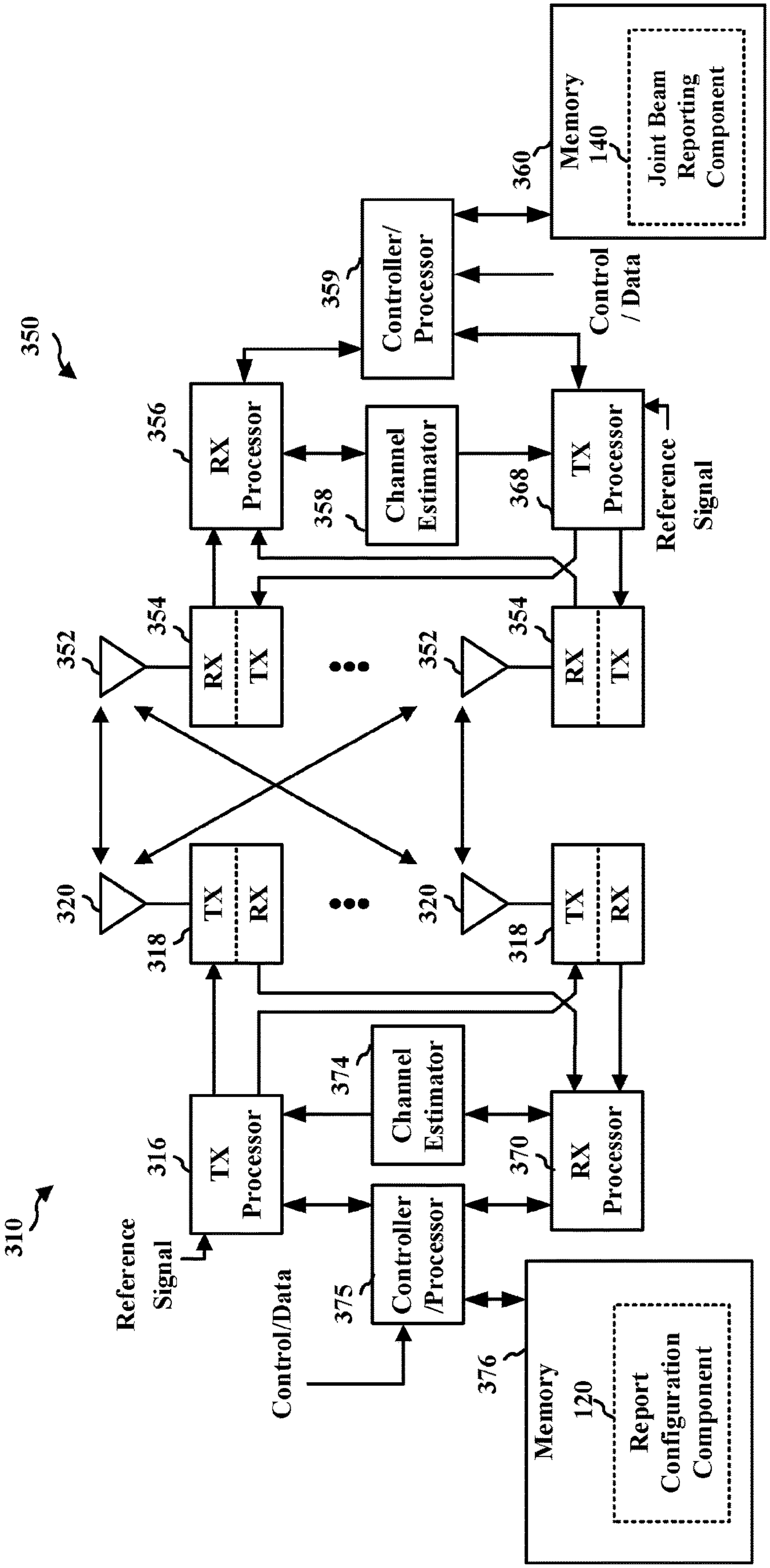
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the joint beam reporting component 140 of FIG. 1.

At least one of the TX processor 316, the RX processor 370, and the controller/processor 375 may be configured to perform aspects in connection with the report configuration component 120 of FIG. 1.

Figure 4:
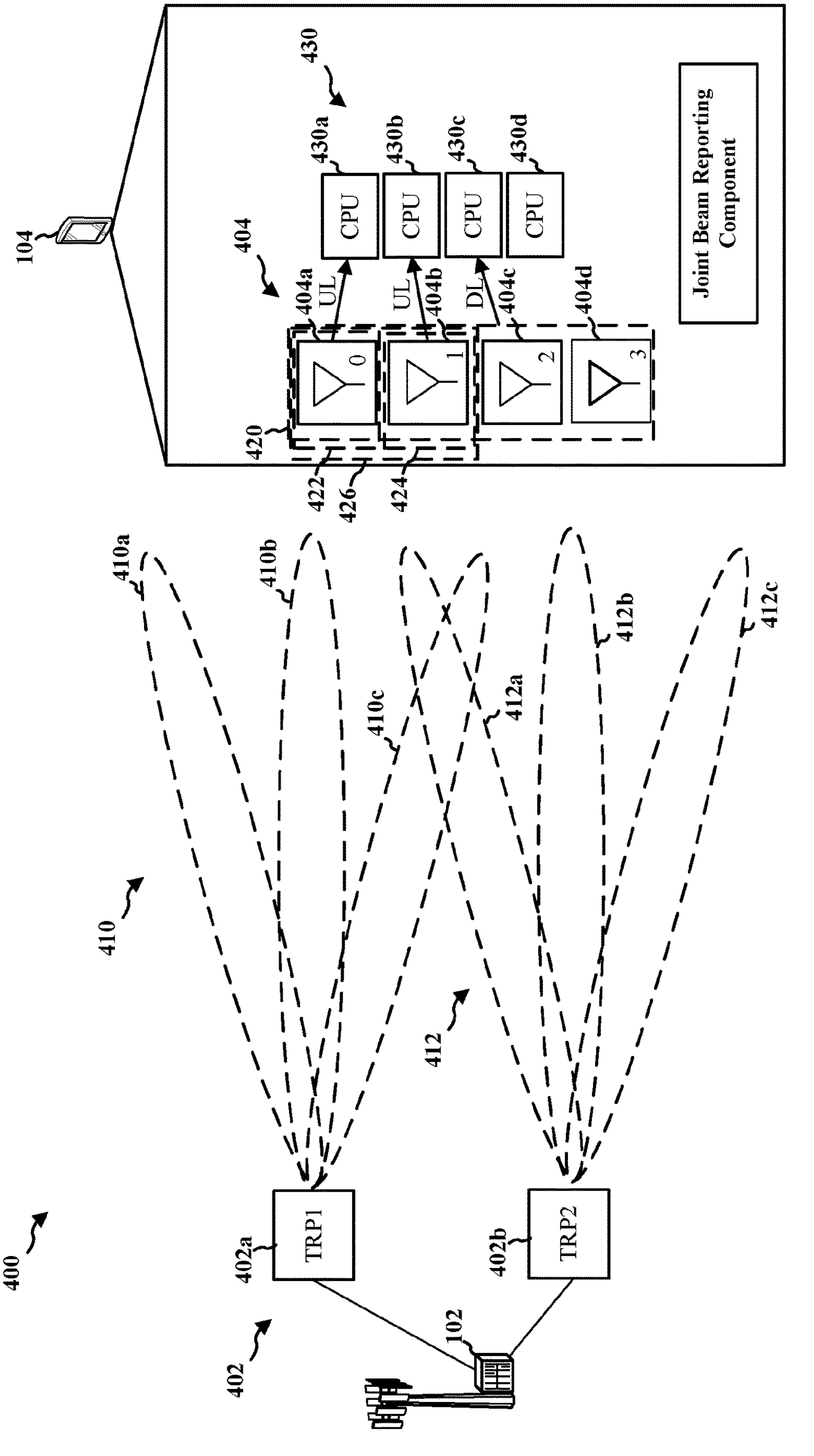
FIG. 4 is a diagram illustrating example messages between a UE and a BS for a joint channel state information (CSI) report.

FIG. 4 is a diagram 400 of a UE 104 measuring reference signals 410, 412 from a base station 102. The base station 102 may include multiple transmit receive points (TRPs) 402 that transmit the reference signals. Each TRP 402 may transmit a reference signal on a beam (e.g., beams 410*a*, 410*b*, 410*c*, 412*a*, 412*b*, 412*c*). The UE 104 may receive beams in different groups (e.g., pairs) concurrently or simultaneously (e.g., on the same time domain resources). For example, in a first group, the TRP 402*a* may transmit the beam 410*a* and the TRP 402*b* may transmit the beam 412*a*, while in a second group, the TRP 402*a* may transmit the beam 410*b* and the TRP 402*b* may transmit the beam 412*b*.

The UE 104 may include multiple panels 404. Each panel may be associated with a panel identifier (ID). For example, the panel 404*a* may have an ID 0, the panel 404*b* may have an ID 1, the panel 404*c* may have an ID 2, and the panel 404*c* may have an ID 3. In an aspect, the UE 104 may use a set of panels for DL reception. For example, the UE 104 may receive via a set 420 including panels 404*a*, 404*b*, 404*c*, and 404*d*. For UL transmission, the UE 104 may use the same set 420 or a subset of the set 420. For example, using fewer panels for UL than DL may facilitate panel selection and allow compliance with MPE limits. For instance, the UE 104 may use a subset 422 including the panel ID 0 or a subset 424 including the panel ID 1, or a subset 426 including the panel ID 0 and the panel ID 1.

The UE 104 may be configured to report CSI metrics, which may be used for selecting beams and panels for transmissions. In an aspect, the UE 104 may include the joint beam reporting component 140 for transmitting a joint CSI report. The joint CSI report may include a DL metric such as reference signal received power (RSRP). The UE 104 may also estimate UL metrics based on the received reference signals 410, 412. The UL metrics may depend on which panels are selected. Accordingly, the joint CSI report may include at least one UL metric and a set of panel IDs associated with the at least one UL metric. In some implementations, the UE 104 may determine at least one UL metric for multiple sets of panels and include multiple sets of panel IDs in the joint CSI report. In an aspect, the UE 104 may support a maximum number of sets of UL panels for the joint CSI report for DL and UL. The UE 104 may indicate a capability of the maximum number of sets of UL panels. For example, the UE 104 may report a maximum number of sets in one CSI report, a maximum number of sets in a single reporting instance that contains multiple CSI reports, and/or a maximum number of sets in simultaneous CSI reports in all serving cells under carrier aggregation operation.

In an aspect, the UE 104 may include a plurality of CSI processing units (CPUs) 430 (e.g., CPUs 430*a*, 430*b*, 430*c*, and 430*d*). A CPU 430 may include hardware processing resources such as processor cycles and memory that can be allocated to determining a CSI metric. Generally, for DL beam reporting, one CPU may be occupied for determining DL metrics such as RSRP or signal to interference plus noise ratio (SINR). For instance, as illustrated, the CPU 430*c* may be occupied for determining a DL metric for all panels in the set 420. For the joint CSI report, zero or more additional CPUs may be occupied for determining the UL metrics. In a first example, the joint CSI report may be considered to occupy one CPU regardless of the number of panels or sets of panels that are reported for the UL information. While this approach provides simplicity in counting occupied CPUs, this approach may require that the resources for each CPU may be greater for handling multiple panels. In another aspect, one CPU may be occupied by the joint CSI report for the DL metric and one or more CPUs may be occupied by the joint CSI report for the at least one UL metric. Separately accounting for the CPU utilization for UL metrics may provide more efficient allocation of CPUs and/or fewer resources per CPU. In some implementations, one CPU may be occupied for each UL panel set. For example, as illustrated, if the joint CSI report is to include a DL RSRP, an UL RSRP for panel subset 422 and an UL RSRP for panel subset 424, the joint CSI report may occupy 3 CPUs. That is, CPU 430*a* may be occupied for an UL metric for panel set 422, CPU 430*b* may be occupied for an UL metric for panel set 424, and CPU 430*c* may be occupied for the DL metric for the panel set 420. In some implementations, one CPU may be occupied for all UL panel sets. That is, the joint CSI report may occupy 2 CPUs regardless of a number of UL panels or panel sets reported. In some implementations, one CPU 430 may be occupied for each UL panel included in the joint CSI report. For example, if the joint CSI report is to include a DL RSRP, an UL RSRP for panel subset 422 and an UL RSRP for panel subset 424, the joint CSI report may occupy 3 CPUs 430. As another example, if the joint CSI report is to include a DL RSRP and an UL RSRP for panel subset 426 including panels 404*a* and 404*b*, then the joint CSI report may occupy 3 CPUs 430.

Figure 5:
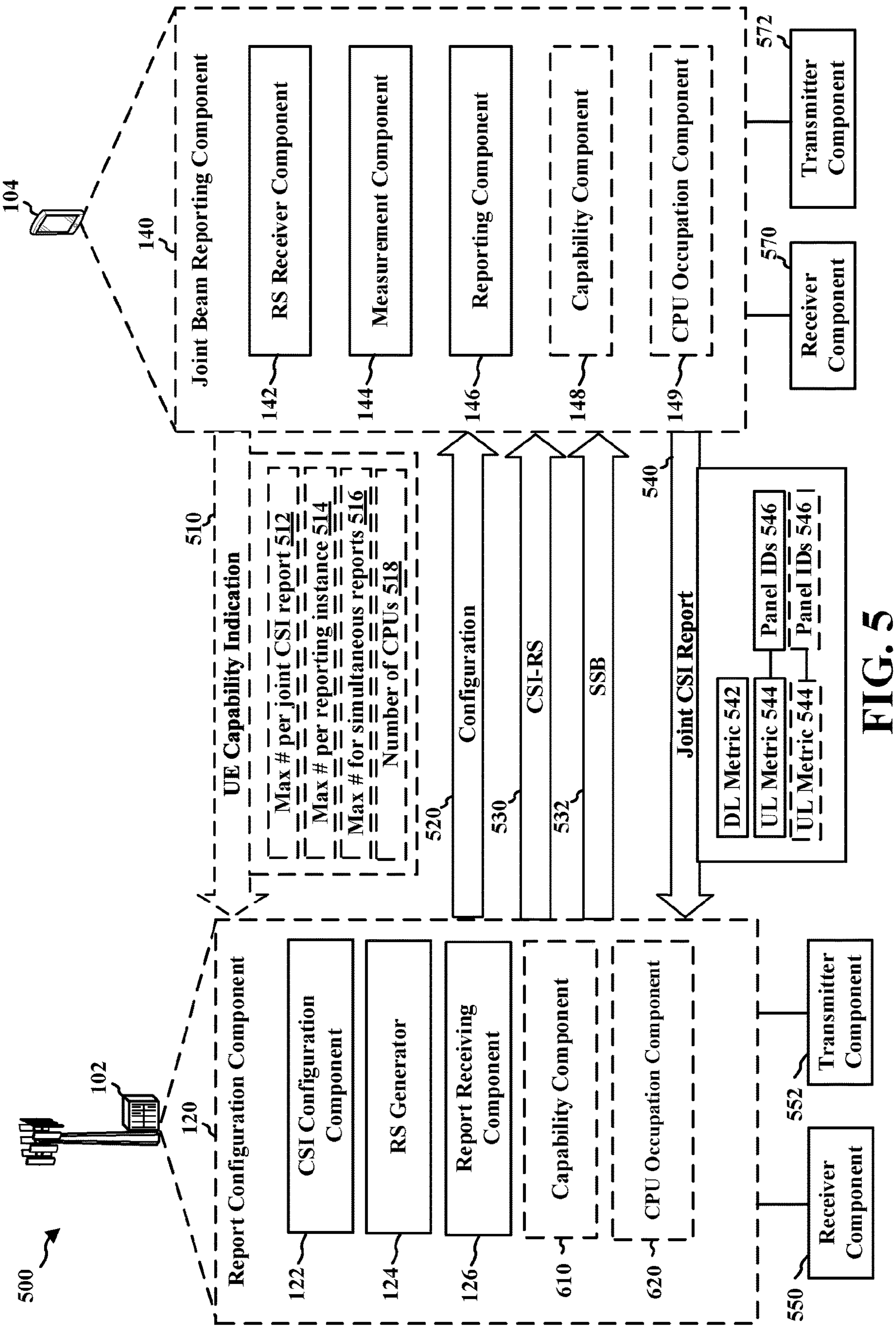
FIG. 5 is a diagram illustrating example communications and components of a base station and a UE.

FIG. 5 is a diagram 500 illustrating example communications and components of a base station 102 and a UE 104. The UE 104 may include the joint beam reporting component 140. The base station 102 may include the report configuration component 120. The report configuration component 120 may be implemented by the memory 376 and the TX processor 316, the RX processor 370, and/or the controller/processor 375 of FIG. 3. For example, the memory 376 may store executable instructions defining the report configuration component 120 and the TX processor 316, the RX processor 370, and/or the controller/processor 375 may execute the instructions. The joint beam reporting component 140 may be implemented by the memory 360 and the TX processor 368, the RX processor 356, and/or the controller/processor 359. For example, the memory 360 may store executable instructions defining the joint beam reporting component 140 and the TX processor 368, the RX processor 356, and/or the controller/processor 359 may execute the instructions.

The base station 102 may include a receiver component 550, which may include, for example, a radio frequency (RF) receiver for receiving the signals described herein. The base station 102 may include a transmitter component 552, which may include, for example, an RF transmitter for transmitting the signals described herein. In an aspect, the receiver component 550 and the transmitter component 552 may co-located in a transceiver such as illustrated by the TX/RX 318 in FIG. 3.

The UE 104 may include a receiver component 570, which may include, for example, a RF receiver for receiving the signals described herein. The UE 104 may include a transmitter component 572, which may include, for example, an RF transmitter for transmitting the signals described herein. In an aspect, the receiver component 570 and the transmitter component 572 may co-located in a transceiver such as the TX/RX 352 in FIG. 3.

As discussed with respect to FIG. 1, the joint beam reporting component 140 may include the RS receiver component 142, the measurement component 144, and the reporting component 146. The joint beam reporting component 140 may optionally include a capability component 610 and/or a CPU occupation component 620.

As discussed with respect to FIG. 1, the report configuration component 120 may include the CSI configuration component 122, the RS generator 124, and the reporting receiving component 126. The report configuration component 120 may optionally include the capability component 148 and/or the CPU occupation component 149.

The joint beam reporting component 140 may transmit a UE capability indication 510 that indicates a capability of the UE to support reporting metrics for multiple sets of panels. For UL metrics, a separate metric may be determined for each set of panels. In some implementations, determining the UL metrics may require separate processing resources such as memory. Accordingly, the UE 104 may be constrained in the number of UL metrics that can be determined in various periods of time. For example, the UE capability indication 510 may include a maximum number of sets of panels per joint CSI report 512. That is, the UE 104 may include up to the maximum number of sets of panels per joint CSI report 512 in the joint CSI report 540. As another example, the UE capability indication 510 may include a maximum number of sets of panels per reporting instance 514. A reporting instance may include multiple CSI reports that are transmitted in a same PUSCH transmission. As another example, the UE capability indication 510 may include a maximum number of sets of panels for simultaneous reports 516. The simultaneous reports may be transmitted on different cells in carrier aggregation. The maximum number of sets of panels for simultaneous reports 516 may be a total number of sets of panels that can be concurrently measured. The UE capability indication 510 may include one or more of the maximum number of sets of panels per joint CSI report 512, the maximum number of sets of panels per reporting instance 514, or the maximum number of sets of panels for simultaneous reports 516 to characterize the measurement capabilities of the UE 104.

In some implementations, the UE capability indication 510 may include a number of CPUs 518. The number of CPUs 518 may be an indication of processing capabilities of the UE 104 for CSI measurements (e.g., the number of CPUs 430). As discussed in further detail below, a CPU may be occupied for determining DL metrics and for determining UL metrics.

The report configuration component 120 may transmit a configuration 520 that configures the UE 104 to measure CSI metrics based on a CSI-RS 530 or SSB 532. For example, the configuration 520 may be a trigger state configuration. The configuration 520 may include RRC signaling that configures a trigger list. For example, the trigger list may be a CSI trigger list defining CSI trigger states. The configuration 520 may include a media access control-control element (MAC-CE) that indicates active trigger states. For instance, the MAC-CE may activate one or more trigger states corresponding to a joint CSI report. For some other examples, the configuration 520 may be an activation command by MAC-CE, which indicates the UE 104 to measure CSI metrics semi-persistently based on a CSI-RS 530 and/or SSB 532. For some other examples, the configuration 520 may be a RRC configuration, which indicates the UE 104 to measure CSI metrics periodically based on a CSI-RS 530. In some other aspects, the configuration 520 may configure the UE 104 to measure CSI metrics based on a set of SSB resources (e.g., SSB 532).

The report configuration component 120 may transmit the CSI-RS 530. The CSI-RS 530 may be based on the configuration 520. That is, the CSI-RS 530 may be transmitted on resources that the UE 104 is configured to measure for a joint CSI report. As discussed above with respect to FIG. 4, the CSI-RS 530 may be transmitted from one or more groups of TRPs 402 of the base station 102. The CSI-RS 530 may be transmitted on one or more beams per group of TRPs. Each beam may be associated with an SSB-index that identifies the beam.

The joint beam reporting component 140 may transmit a joint CSI report 540. The joint CSI report 540 may include a DL metric 542 and at least one UL metric 544. The at least one UL metric 544 may be associated with a set of panel IDs 546. For example, the set of panel IDs 546 may include one or more IDs of the panels 404 included in the set, or may include an ID of a set of panels (e.g., sets 422, 424, 426).

Figure 6:
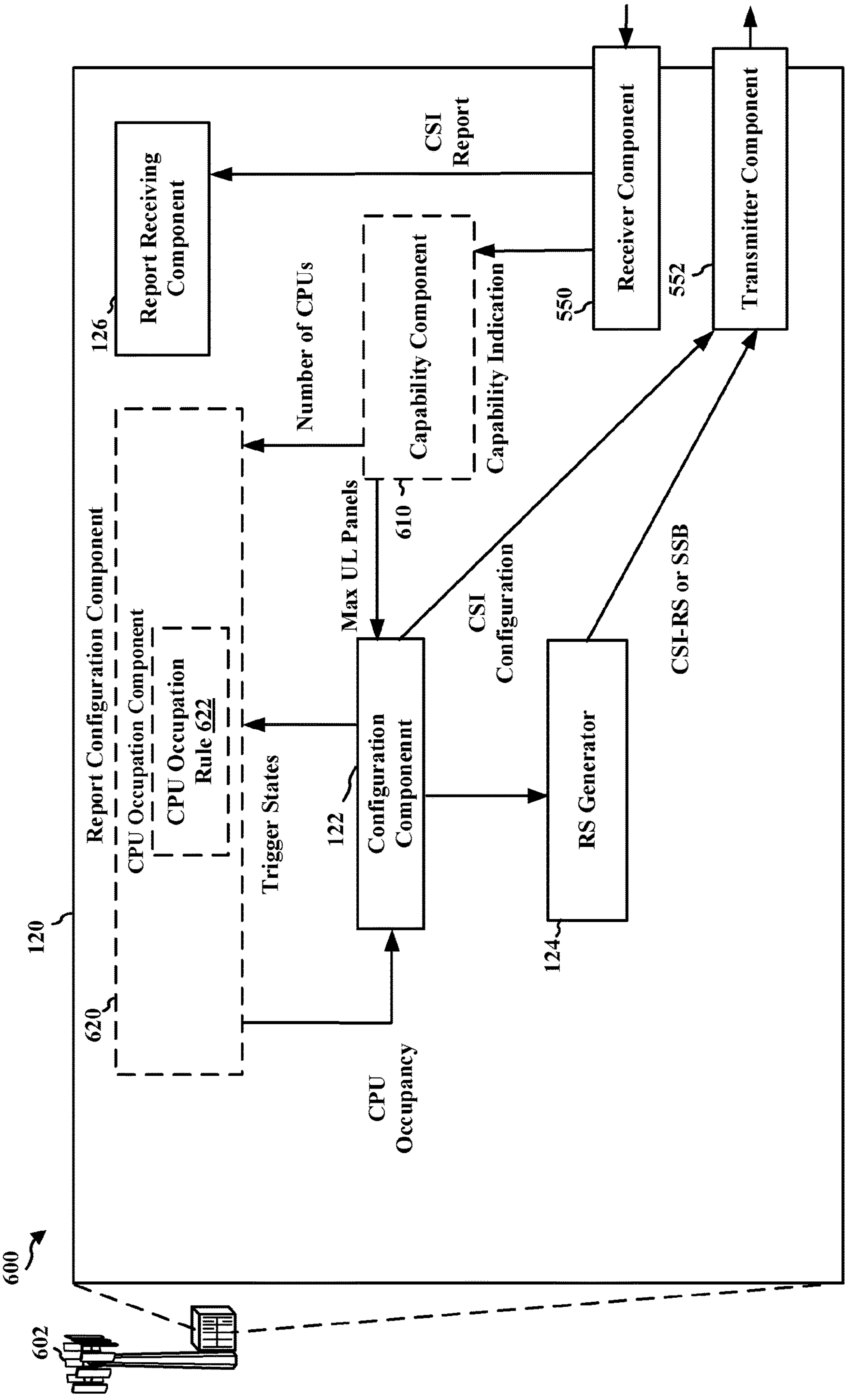
FIG. 6 is a conceptual data flow diagram illustrating the data flow between different means/components in an example BS.

FIG. 6 is a conceptual data flow diagram 600 illustrating the data flow between different means/components in an example base station 602, which may be an example of the base station 102 including the report configuration component 120.

The receiver component 550 may receive UL signals from the UE 104 including the UE capability indication 510 and the joint CSI report 540. The receiver component 550 may provide the UE capability indication 510 to the CSI configuration component 122 and/or the CPU occupation component 620. The receiver component 550 may provide the CSI report to the report receiving component 126.

The capability component 610 may receive the capability indication 510 via the receiver component 550. The capability component 610 may extract UE capability information from the capability indication 510. For example, the capability indication 510 may be an RRC message, and the capability component 610 may extract information elements from the capability indication 510 according to a definition of the RRC message. The capability component 610 may provide the number of CPUs 518 to the CPU occupation component 620. The capability component 610 may provide the maximum number of UL panels (e.g., one or more of the maximum number of sets of panels per joint CSI report 512, the maximum number of sets of panels per reporting instance 514, or the maximum number of sets of panels for simultaneous reports 516) to the CSI configuration component 122.

The CSI configuration component 122 may receive the maximum number of UL panels from the capability component 610. The CSI configuration component 122 may determine a CSI configuration for a UE 104 including a joint CSI report based on the maximum number of UL panels. For example, the CSI configuration component 122 may determine CSI trigger states that specify a joint CSI report for up to the maximum number of UL panels. In an aspect, the CSI configuration component 122 may also consider CPU occupancy in determining the CSI configuration. For example, the CSI configuration component 122 may provide the trigger states to the CPU occupation component 620. The CSI configuration component 122 may receive an indication of CPU occupancy for each trigger state. The CSI configuration component 122 may activate or deactivate trigger states such that the CPU occupancy does not exceed the number of CPUs. The CSI configuration component 122 may transmit the CSI configuration to the UE 104 via the transmitter component 552. For example, the CSI configuration may include an RRC message that configures the trigger states and a MAC-CE that activates a subset of the trigger states. The CSI configuration component 122 may also provide the CSI configuration to the RS generator 124.

The RS generator 124 may receive the CSI configuration from the CSI configuration component 122. The RS generator 124 may transmit the CSI-RS 530 via the transmitter component 552. For example, the RS generator 124 may generate the CSI-RS 530 based on the CSI configuration. That is, the RS generator 124 may generate the CSI-RS 530 for transmission on the resources indicated in the active trigger states configured for the UE 104.

The CPU occupation component 620 may determine that at least one CPU is occupied for reporting the at least one UL metric. In an aspect, the CPU occupation component 620 may receive the number of CPUs for a UE 104 from the capability component 610. The CPU occupation component 620 may be configured with a CPU occupation rule 622 for determining the number of CPUs occupied for reporting the at least one UL metric. The CPU occupation component 620 may receive a trigger state from the configuration component. The trigger state may define a joint CSI report 540 to be transmitted. The CPU occupation component may determine a number of CPUs occupied for by the report for each trigger state. In an aspect, each joint CSI report 540 may occupy at least one CPU for the DL metric and zero or more CPUs for the at least one UL metric. The CPU occupation rule 622 may define the number of CPUs for the at least one UL metric. The CPU occupation rule 622 may be preconfigured, selected by the base station 102, or defined in a standards document or regulation.

The report receiving component 126 may receive the joint CSI report 540 via the receiver component 550. The joint CSI report 540 may include the at least one DL metric 542, the at least one UL metric 544, and the at least one set of UL panel IDs 546 associated with the at least one UL metric 544. In some implementations, the report receiving component 126 may select a TRP (or group of TRPs), one or more beams and/or a set of panels for transmission based on the joint CSI report 540. For example, the report receiving component 126 may determine to schedule the UE 104 to transmit using a set of panels having a best UL metric indicated in the joint CSI report 540. The report receiving component 126 may transmit a panel activation command and/or a downlink control information (DCI) to indicate the selected set of panels.

Figure 7:
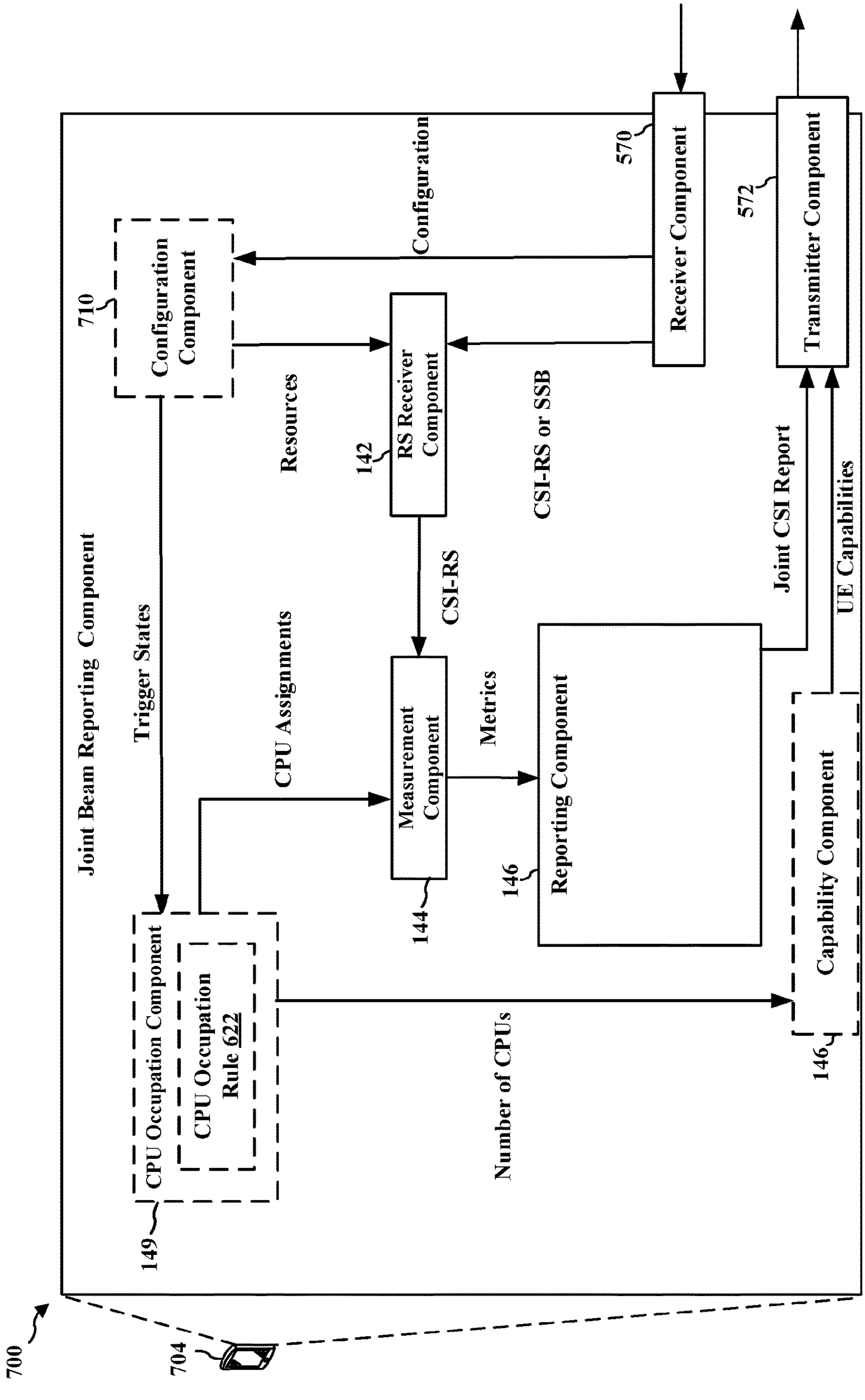
FIG. 7 is a conceptual data flow diagram illustrating the data flow between different means/components in an example UE.

FIG. 7 is a conceptual data flow diagram 700 illustrating the data flow between different means/components in an example UE 704, which may be an example of the UE 104 and include the joint beam reporting component 140.

In an aspect, the capability component 148 may transmit the UE capability indication 510. The capability component 148 may determine capabilities of the UE 104 based on a hardware configuration (e.g., number of CPUs or other processing resources) of the UE 104. For instance, the capability component 148 may receive an indication of the number of CPUs from the CPU occupation component 149. The capability component 148 may generate the UE capability indication 510 as an RRC message including an information element for one or more of the maximum number of sets of panels per joint CSI report 512, the maximum number of sets of panels per reporting instance 514, or the maximum number of sets of panels for simultaneous reports 516. In some implementations, the capability component 148 may include an information element for the number of CPUs 518 in the UE capability indication 510.

The receiver component 570 may receive DL signals such as the configuration 520, and the CSI-RS 530 and the SSB 532. The receiver component 570 may provide the configuration 520 to the configuration component 710. The receiver component 570 may provide the CSI-RS 530 and/or SSB 532 to the RS receiver component 142 and/or the measurement component 144.

The configuration component 710 may receive the configuration 520 from the receiver component 570. The configuration component 710 may extract a CSI configuration from the configuration 520. For example, the configuration 520 may include an RRC message including a list of triggers such as CSI trigger states. The configuration component 710 may configure the RS receiver component 142 with the resources corresponding to the configured trigger states. In some implementations, where the configuration 520 includes a MAC-CE indicating active trigger states, the configuration component 710 may provide the subset of activated trigger states to the RS receiver component 142. In some implementations, the configuration component 710 may also provide the trigger states to the CPU occupation component 149.

The RS receiver component 142 may receive the configuration of resources from the configuration component 710. The RS receiver component 142 may receive the CSI-RS 530 and/or the SSB 532 from the receiver component 570. The RS receiver component 142 may provide the received CSI-RS and/or SSB to the measurement component 144. For example, the RS receiver component 142 may provide the signals received on the configured resources.

The CPU occupation component 149 may determine that at least one CPU 430 is occupied for reporting the at least one UL metric. For example, the CPU occupation component 149 may determine a number of CPUs occupied by each active CSI report. In some aspects, an active CSI report may include aperiodic CSI reports triggered by the trigger state indicated in the DCI, semi-persistent CSI reports activated by MAC-CE, or periodical CSI reports configured by the RRC configuration. The CPU occupation component 149 may assign CPUs to the measurement component 144 for determining the metrics. For example, the CPU occupation component 149 may assign one CPU for measuring the DL metric 542 and zero or more CPUs for measuring the at least one UL metric 544. The CPU occupation component 149 may be configured with the same CPU occupation rule 622 as the base station 602 and the CPU occupation component 620. The CPU occupation component 149 may determine the number of CPUs occupied for the UL metric based on the CPU occupation rule 622.

The measurement component 144 may measure CSI metrics based on the CSI-RS. The CSI metrics may include the at least one DL metric 542 and the at least one UL metric 544 for at least one set of UL panel IDs (e.g., set 422, 424, or 426). The measurement component 144 may measure the CSI metrics using the assigned CPUs 430. The measurement component 144 may provide the CSI metrics to the reporting component 146.

The reporting component 146 may transmit the joint CSI report 540 including the at least one DL metric 542, the at least one UL metric 544, and the set of UL panel IDs 546 associated with the at least one UL metric 544. In an aspect, the reporting component 146 may transmit the joint CSI report as UL control information (UCI) on the PDSCH via the transmitter component 572.

Figure 8:
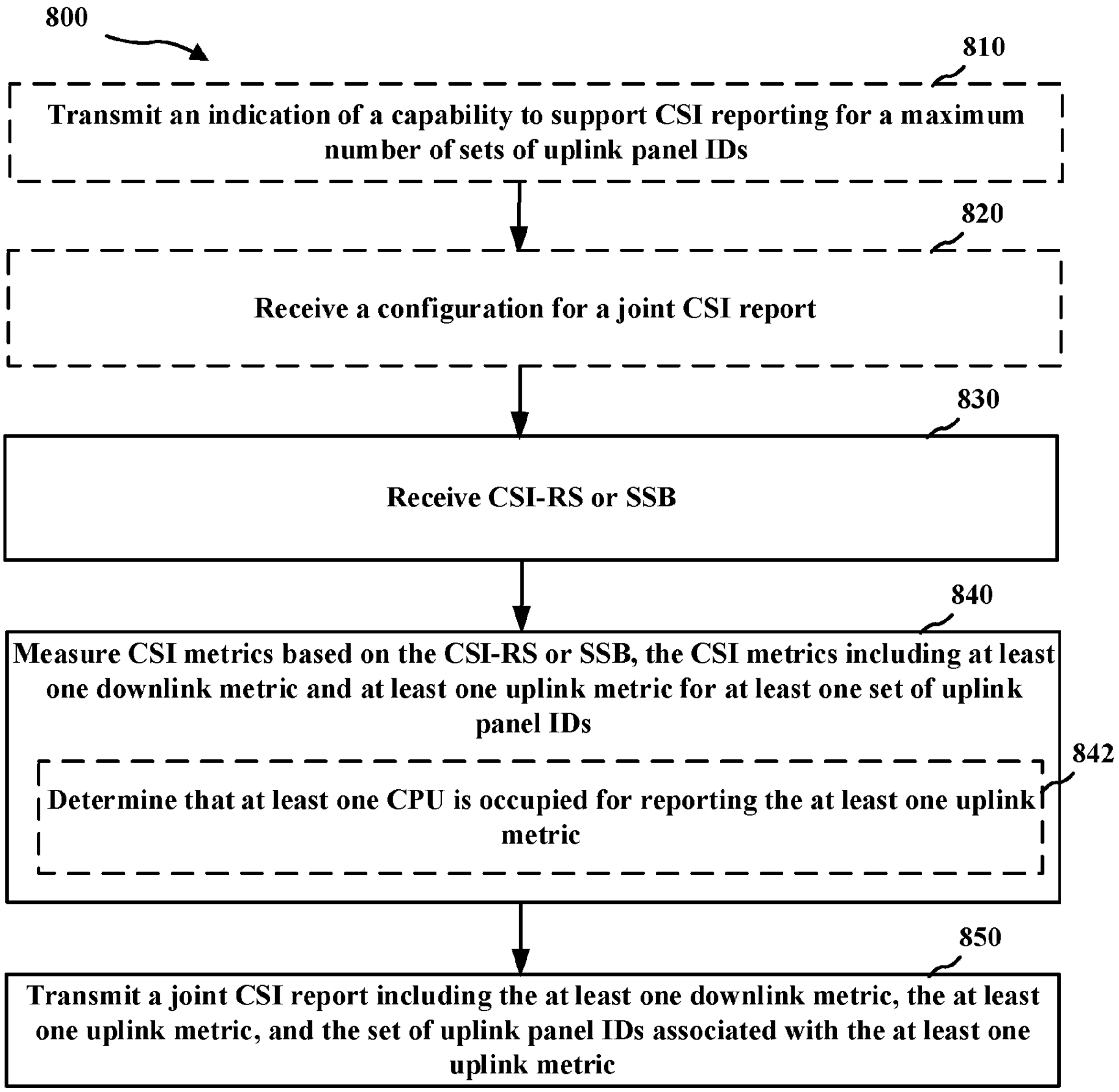
FIG. 8 is a flowchart of an example method for a UE to transmit a joint CSI report.

FIG. 8 is a flowchart of an example method 800 for a UE to transmit a joint CSI report. The method 800 may be performed by a UE (such as the UE 104, which may include the memory 360 and which may be the entire UE 104 or a component of the UE 104 such as the joint beam reporting component 140, TX processor 368, the RX processor 356, or the controller/processor 359). The method 800 may be performed by the joint beam reporting component 140 in communication with the report configuration component 120 of the base station 102. Optional blocks are shown with dashed lines.

At block 810, the method 800 may optionally include transmitting an indication of a capability to support CSI reporting for a maximum number of sets of UL panel IDs. In some implementations, for example, the UE 104, the TX processor 368, or the controller/processor 359 may execute the joint beam reporting component 140 or the capability component 148 to transmit the UE capability indication 510 including an indication of a capability to support CSI reporting for a maximum number of sets of UL panel IDs. For instance, the UE capability indication 510 may include one or more of the maximum number of sets of panels per joint CSI report 512, the maximum number of sets of panels per reporting instance 514, or the maximum number of sets of panels for simultaneous reports 516. Accordingly, the UE 104, the TX processor 368, or the controller/processor 359 executing the joint beam reporting component 140 or the capability component 148 may provide means for transmitting an indication of a capability to support CSI reporting for a maximum number of sets of UL panel IDs.

At block 820, the method 800 may optionally include receiving a configuration for a joint CSI report. In some implementations, for example, the UE 104, the RX processor 356 or the controller/processor 359 may execute the joint beam reporting component 140 or the configuration component 710 to receive the configuration 520 for a joint CSI report 540. Accordingly, the UE 104, the RX processor 356, or the controller/processor 359 executing the joint beam reporting component 140 or the configuration component 710 may provide means for receiving a configuration for a joint CSI report.

At block 830, the method 800 may include receiving CSI-RS or SSB. In some implementations, for example, the UE 104, the RX processor 356 or the controller/processor 359 may execute the joint beam reporting component 140 or the RS receiver component 142 to receive the CSI-RS 530. For example, the RS receiver component 142 may receive the CSI-RS 530 and/or the SSB 532 on resources configured by the configuration 520. Accordingly, the UE 104, the RX processor 356, or the controller/processor 359 executing the joint beam reporting component 140 or the RS receiver component 142 may provide means for receiving CSI-RS or SSB.

At block 840, the method 800 may include measuring CSI metrics based on the CSI-RS or the SSB, the CSI metrics including at least one DL metric and at least one UL metric for at least one set of UL panel IDs. In some implementations, for example, the UE 104, the RX processor 356 or the controller/processor 359 may execute the joint beam reporting component 140 or the measurement component 144 to measure the CSI metrics based on the CSI-RS 530 and/or the SSB 532. The CSI metrics may include at least one DL metric 542 and at least one UL metric 544 for at least one set of UL panel IDs (e.g., sets 420, 422, 424, and 426).

In an aspect, at sub-block 842, the block 840 may include determining that at least one CPU is occupied for reporting the at least one UL metric. For example, the CPU occupation component 149 may determine that at least one CPU 430 is occupied for reporting the at least one UL metric 544. The CPU occupation component 149 may determine how many CPUs 430 are occupied for reporting the at least one UL metric 544 based on a CPU occupation rule 622. In a first example, the CPU occupation rule 622 indicates that one CPU is occupied for the joint CSI report 540. In a second example, the CPU occupation rule 622 indicates that one CPU is occupied for the at least one DL metric and at least one CPU is occupied for the at least one UL metric. In a third example, the CPU occupation rule 622 indicates that one CPU is occupied for each of the at least one set of UL panel IDs. In a fourth example, the CPU occupation rule 622 indicates that one CPU is occupied for all of the at least one set of UL panel IDs. In a fifth example, the CPU occupation rule 622 indicates that one CPU is occupied for each UL panel ID. In view of the foregoing, the UE 104, the RX processor 356, or the controller/processor 359 executing the joint beam reporting component 140, the measurement component 144, and/or the CPU occupation component 149 may provide means for measuring CSI metrics based on the CSI-RS.

At block 850, the method 800 may include transmitting a joint CSI report including the at least one DL metric, the at least one UL metric, and the set of UL panel IDs associated with the at least one UL metric. In some implementations, for example, the UE 104, the TX processor 368, or the controller/processor 359 may execute the joint beam reporting component 140 or the reporting component 146 to transmit the joint CSI report 540 including the at least one DL metric 542, the at least one UL metric 544, and the set of UL panel IDs 546 associated with the at least one UL metric 544. Accordingly, the UE 104, the TX processor 368, or the controller/processor 359 executing the joint beam reporting component 140 or the reporting component 146 may provide means for transmitting a joint CSI report including the at least one DL metric, the at least one UL metric, and the set of UL panel IDs associated with the at least one UL metric.

Figure 9:
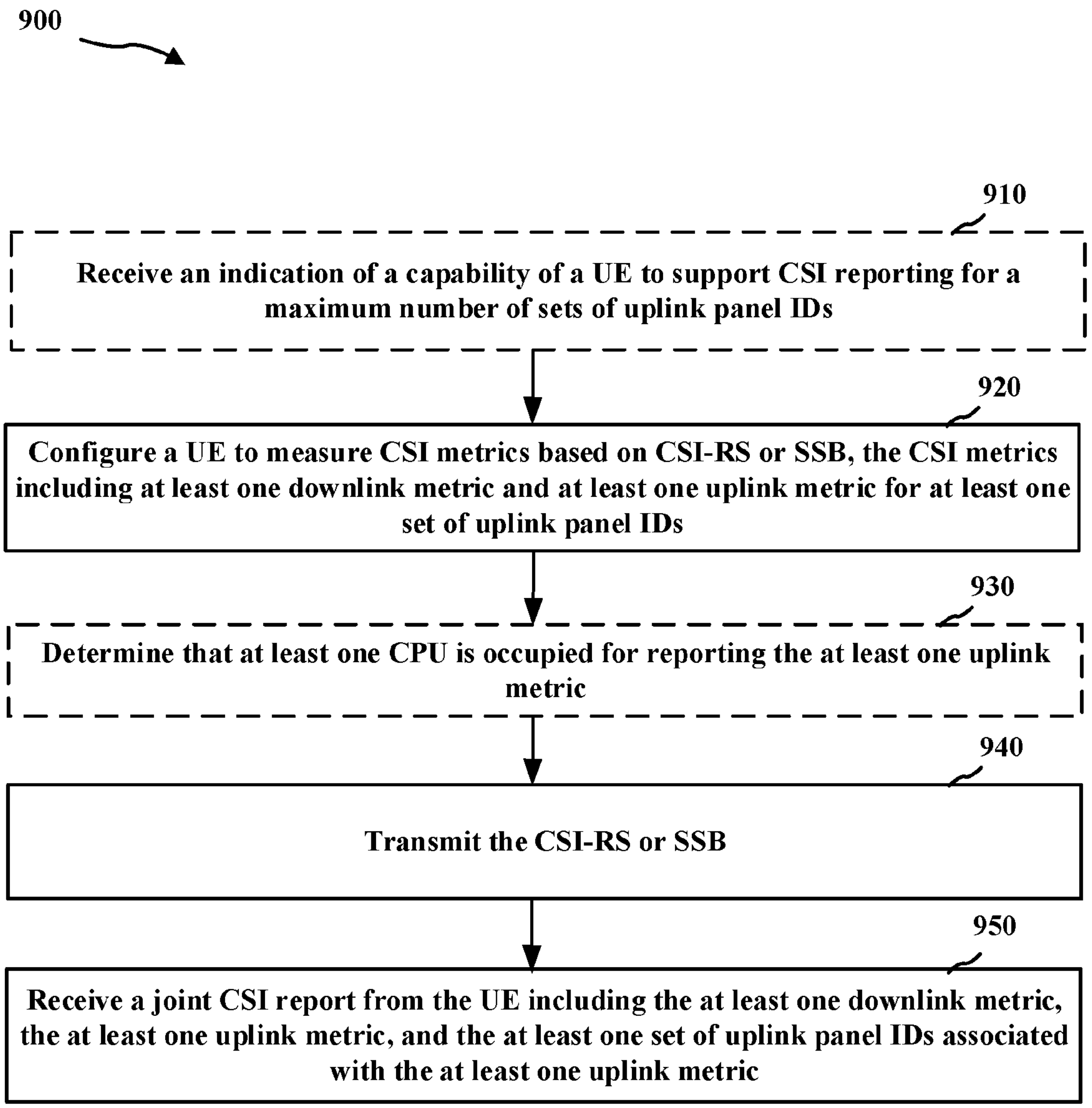
FIG. 9 is a flowchart of an example method for a BS to receive a joint CSI report.

FIG. 9 is a flowchart of an example method 900 for a base station to receive a joint CSI report. The method 900 may be performed by a base station (such as the base station 102, which may include the memory 376 and which may be the entire base station 102 or a component of the base station 102 such as the report configuration component 120, the TX processor 316, the RX processor 370, or the controller/processor 375). The method 900 may be performed by the report configuration component 120 in communication with the joint beam reporting component 140 of the UE 104.

At block 910, the method 900 may optionally include receiving an indication of a capability to support CSI reporting for a maximum number of sets of UL panel IDs. In some implementations, for example, the base station 102, the RX processor 370, or the controller/processor 375 may execute the report configuration component 120 or the capability component 610 to receive the UE capability indication 510 including the indication of the capability of the UE to support CSI reporting for a maximum number of sets of UL panel IDs. For instance, the UE capability indication 510 may include a may include one or more of one or more of the maximum number of sets of panels per joint CSI report 512, the maximum number of sets of panels per reporting instance 514, or the maximum number of sets of panels for simultaneous reports 516. In some implementations, the UE capability indication 510 may include the number of CPUs 518. Accordingly, the base station 102, the RX processor 370, or the controller/processor 375 executing the report configuration component 120 or the capability component 610 may provide means for receiving an indication of a capability to support CSI reporting for a maximum number of sets of UL panel IDs.

At block 920, the method 900 may include configuring the UE to measure CSI metrics based on CSI-RS or SSB, the CSI metrics including at least one DL metric and at least one UL metric for at least one set of UL panel IDs. In some implementations, for example, base station 102, the TX processor 316, or the controller/processor 375 may execute the report configuration component 120 or the CSI configuration component 122 to configure the UE 104 to measure CSI metrics based on the CSI-RS 530 and/or SSB 532. The CSI metrics may include at least one DL metric 542 and at least one UL metric 544 for at least one set of UL panel IDs 546. Accordingly, the base station 102, the TX processor 316, or the controller/processor 375 executing the report configuration component 120 or the CSI configuration component 122 may provide means for configuring the UE to measure CSI metrics based on CSI-RS or SSB, the CSI metrics including at least one DL metric and at least one UL metric for at least one set of UL panel IDs.

At block 930, the method 900 may optionally include determining that at least one CPU is occupied for reporting the at least one UL metric. In some implementations, for example, base station 102, the TX processor 316, or the controller/processor 375 may execute the report configuration component 120 or the CPU occupation component 620 to determine that at least one CPU is occupied for reporting the at least one UL metric. The CPU occupation component 620 may determine how many CPUs 430 are occupied for reporting the at least one UL metric 544 based on a CPU occupation rule 622. In a first example, the CPU occupation rule 622 indicates that one CPU is occupied for the joint CSI report 540. In a second example, the CPU occupation rule 622 indicates that one CPU is occupied for the at least one DL metric and at least one CPU is occupied for the at least one UL metric. In a third example, the CPU occupation rule 622 indicates that one CPU is occupied for each of the at least one set of UL panel IDs. In a fourth example, the CPU occupation rule 622 indicates that one CPU is occupied for all of the at least one set of UL panel IDs. In a fifth example, the CPU occupation rule 622 indicates that one CPU is occupied for each UL panel ID. Accordingly, the base station 102, the TX processor 316, or the controller/processor 375 executing the report configuration component 120 or the CPU occupation component 620 may provide means for determining that at least one CPU is occupied for reporting the at least one UL metric.

At block 940, the method 900 may include transmitting the CSI-RS or SSB. In some implementations, for example, base station 102, the TX processor 316, or the controller/processor 375 may execute the report configuration component 120 or RS generator 124 to transmit the CSI-RS 530. For example, the RS generator 124 may transmit the CSI-RS 530 and/or the SSB 532 to the UE 104 on resources configured for the UE 104 via the transmitter component 552. Accordingly, the base station 102, the TX processor 316, or the controller/processor 375 executing the report configuration component 120 or the RS generator 124 may provide means for transmitting the CSI-RS or SSB.

At block 950, the method 900 may include receiving a joint CSI report from the UE including the at least one DL metric, the at least one UL metric, and the at least one set of UL panel IDs associated with the at least one UL metric. In some implementations, for example, the base station 102, the RX processor 370, or the controller/processor 375 may execute the report configuration component 120 or the report receiving component 126 to receive the joint CSI report 540 from the UE 104 including the at least one DL metric 542, the at least one UL metric 544, and the at least one set of UL panel IDs 546 associated with the at least one UL metric 544. Accordingly, the base station 102, the RX processor 370, or the controller/processor 375 executing the report configuration component 120 or the capability component 610 may provide means for receiving a joint CSI report from the UE including the at least one DL metric, the at least one UL metric, and the at least one set of UL panel IDs associated with the at least one UL metric.

Some Further Example Clauses

Implementation examples are described in the following numbered clauses:

1. A method of wireless communication, comprising:
   receiving channel state information (CSI) reference signals (RS) or synchronization signal blocks (SSB);
   measuring CSI metrics based on the CSI-RS or SSB, the CSI metrics including at least one downlink metric and at least one uplink metric for at least one set of uplink panel identifiers (IDs); and
   transmitting a joint CSI report including the at least one downlink metric, the at least one uplink metric, and the set of uplink panel IDs associated with the at least one uplink metric.
2. The method of clause 1, further comprising transmitting an indication of a capability to support CSI reporting for a maximum number of sets of uplink panel IDs.
3. The method of clause 2, wherein the capability is a maximum number of sets of uplink panel IDs in one joint CSI report.
4. The method of clause 2, wherein the capability is a maximum number of sets of uplink panel IDs in a single reporting instance that includes multiple CSI reports.
5. The method of clause 2, wherein the capability is a maximum number of sets of uplink panel IDs in simultaneous CSI reports on all serving cells.
6. The method of any of clauses 1-6, wherein measuring the CSI metrics based on the CSI-RS or SSB comprises determining that at least one CSI processing unit (CPU) is occupied for reporting the at least one uplink metric.
7. The method of clause 6, wherein one CPU is occupied for the joint CSI report.
8. The method of clause 6, wherein one CPU is occupied for the at least one downlink metric and at least one CPU is occupied for the at least one uplink metric.
9. The method of clause 8, wherein one CPU is occupied for each of the at least one set of uplink panel IDs.
10. The method of clause 8, wherein one CPU is occupied for all of the at least one set of uplink panel IDs.
11. The method of clause 8, wherein one CPU is occupied for each uplink panel ID.
12. A method of wireless communication, comprising:
   configuring a user equipment (UE) to measure channel state information (CSI) metrics based on CSI reference signals (RS) or synchronization signal blocks (SSB), the CSI metrics including at least one downlink metric and at least one uplink metric for at least one set of uplink panel identifiers (IDs);
   transmitting the CSI-RS or SSB; and receiving a joint CSI report from the UE including the at least one downlink metric, the at least one uplink metric, and the at least one set of uplink panel IDs associated with the at least one uplink metric.

13. The method of clause 12, further comprising receiving an indication of a capability of the UE to support CSI reporting for a maximum number of sets of uplink panel IDs.

14. The method of clause 13, wherein the capability is a maximum number of sets of uplink panel IDs in one joint CSI report.

15. The method of clause 13, wherein the capability is a maximum number of sets of uplink panel IDs in a single reporting instance that includes multiple CSI reports.

16. The method of clause 13, wherein the capability is a maximum number of sets of uplink panel IDs in simultaneous CSI reports on all serving cells.

17. The method of any of clauses 12-16, further comprising determining that at least one CSI processing unit (CPU) is occupied for reporting the at least one uplink metric.

18. The method of clause 17, wherein one CPU is occupied for the joint CSI report.

19. The method of clause 17 wherein one CPU is occupied for the at least one downlink metric and at least one CPU is occupied for the at least one uplink metric.

20. The method of clause 19, wherein one CPU is occupied for each of the at least one set of uplink panel IDs.

21. The method of clause 19, wherein one CPU is occupied for all of the at least one set of uplink panel IDs.

22. The method of clause 19, wherein one CPU is occupied for each uplink panel ID.

23. An apparatus for wireless communication, comprising:

a memory storing computer-executable instructions; and at least one processor coupled with the memory and configured to execute the instructions to:

receive channel state information (CSI) reference signals (RS) or synchronization signal blocks (SSB);

measure CSI metrics based on the CSI-RS or SSB, the CSI metrics including at least one downlink metric and at least one uplink metric for at least one set of uplink panel identifiers (IDs); and transmit a joint CSI report including the at least one downlink metric, the at least one uplink metric, and the set of uplink panel IDs associated with the at least one uplink metric.

24. The apparatus of clause 23, wherein the at least one processor is configured to transmit an indication of a capability to support CSI reporting for a maximum number of sets of uplink panel IDs.

25. The apparatus of clause 24, wherein the capability is a maximum number of sets of uplink panel IDs in one joint CSI report.

26. The apparatus of clause 24, wherein the capability is a maximum number of sets of uplink panel IDs in a single reporting instance that includes multiple CSI reports.

27. The apparatus of clause 24, wherein the capability is a maximum number of sets of uplink panel IDs in simultaneous CSI reports on all serving cells.

28. The apparatus of any of clauses 23-27, wherein the at least one processor is configured to determine that at least one CSI processing unit (CPU) is occupied for reporting the at least one uplink metric.

29. The apparatus of clause 28, wherein one CPU is occupied for the joint CSI report.

30. The apparatus of clause 28, wherein one CPU is occupied for the at least one downlink metric and at least one CPU is occupied for the at least one uplink metric.

31. The apparatus of clause 30, wherein one CPU is occupied for each of the at least one set of uplink panel IDs.

32. The apparatus of clause 30, wherein one CPU is occupied for all of the at least one set of uplink panel IDs.

33. The apparatus of clause 30, wherein one CPU is occupied for each uplink panel ID.

34. An apparatus for wireless communication, comprising:

a memory storing computer-executable instructions; and at least one processor coupled with the memory and configured to execute the instructions to:

configure a user equipment (UE) to measure channel state information (CSI) metrics based on CSI reference signals (RS) or synchronization signal blocks (SSB), the CSI metrics including at least one downlink metric and at least one uplink metric for at least one set of uplink panel identifiers (IDs);

transmit the CSI-RS or SSB; and receive a joint CSI report from the UE including the at least one downlink metric, the at least one uplink metric, and the at least one set of uplink panel IDs associated with the at least one uplink metric.

35. The apparatus of clause 34, wherein the at least one processor is configured to receive an indication of a capability of the UE to support CSI reporting for a maximum number of sets of uplink panel IDs.

36. The apparatus of clause 35, wherein the capability is a maximum number of sets of uplink panel IDs in one joint CSI report.

37. The apparatus of clause 35, wherein the capability is a maximum number of sets of uplink panel IDs in a single reporting instance that includes multiple CSI reports.

38. The apparatus of clause 35, wherein the capability is a maximum number of sets of uplink panel IDs in simultaneous CSI reports on all serving cells.

39. The apparatus of any of clauses 34-38, wherein the at least one processor is configured to determine that at least one CSI processing unit (CPU) is occupied for reporting the at least one uplink metric.

40. The apparatus of clause 39, wherein one CPU is occupied for the joint CSI report.

41. The apparatus of clause 39 wherein one CPU is occupied for the at least one downlink metric and at least one CPU is occupied for the at least one uplink metric.

42. The apparatus of clause 41, wherein one CPU is occupied for each of the at least one set of uplink panel IDs.

43. The apparatus of clause 41, wherein one CPU is occupied for all of the at least one set of uplink panel IDs.

44. The apparatus of clause 41, wherein one CPU is occupied for each uplink panel ID.
45. An apparatus for wireless communication, comprising:
means for receiving channel state information (CSI) reference signals (RS) or synchronization signal blocks (SSB);
means for measuring CSI metrics based on the CSI-RS or SSB, the CSI metrics including at least one downlink metric and at least one uplink metric for at least one set of uplink panel identifiers (IDs); and
means for transmitting a joint CSI report including the at least one downlink metric, the at least one uplink metric, and the set of uplink panel IDs associated with the at least one uplink metric.
46. The apparatus of clause 45, further comprising means for transmitting an indication of a capability to support CSI reporting for a maximum number of sets of uplink panel IDs.
47. The apparatus of clause 46, wherein the capability is a maximum number of sets of uplink panel IDs in one joint CSI report.
48. The apparatus of clause 46, wherein the capability is a maximum number of sets of uplink panel IDs in a single reporting instance that includes multiple CSI reports.
49. The apparatus of clause 46, wherein the capability is a maximum number of sets of uplink panel IDs in simultaneous CSI reports on all serving cells.
50. The apparatus of any of clauses 45-49, wherein the means for measuring the CSI metrics based on the CSI-RS or SSB is configured to determine that at least one CSI processing unit (CPU) is occupied for reporting the at least one uplink metric.
51. The apparatus of clause 50, wherein one CPU is occupied for the joint CSI report.
52. The apparatus of clause 50, wherein one CPU is occupied for the at least one downlink metric and at least one CPU is occupied for the at least one uplink metric.
53. The apparatus of clause 52, wherein one CPU is occupied for each of the at least one set of uplink panel IDs.
54. The apparatus of clause 52, wherein one CPU is occupied for all of the at least one set of uplink panel IDs.
55. The apparatus of clause 52, wherein one CPU is occupied for each uplink panel ID.
56. An apparatus for wireless communication, comprising:
means for configuring a user equipment (UE) to measure channel state information (CSI) metrics based on CSI reference signals (RS) or synchronization signal blocks (SSB), the CSI metrics including at least one downlink metric and at least one uplink metric for at least one set of uplink panel identifiers (IDs);
means for transmitting the CSI-RS or SSB; and
means for receiving a joint CSI report from the UE including the at least one downlink metric, the at least one uplink metric, and the at least one set of uplink panel IDs associated with the at least one uplink metric.
57. The apparatus of clause 56, further comprising means for receiving an indication of a capability of the UE to support CSI reporting for a maximum number of sets of uplink panel IDs.
58. The apparatus of clause 57, wherein the capability is a maximum number of sets of uplink panel IDs in one joint CSI report.
59. The apparatus of clause 57, wherein the capability is a maximum number of sets of uplink panel IDs in a single reporting instance that includes multiple CSI reports.
60. The apparatus of clause 57, wherein the capability is a maximum number of sets of uplink panel IDs in simultaneous CSI reports on all serving cells.
61. The apparatus of any of clauses 56-60, further comprising means for determining that at least one CSI processing unit (CPU) is occupied for reporting the at least one uplink metric.
62. The apparatus of clause 61, wherein one CPU is occupied for the joint CSI report.
63. The apparatus of clause 61 wherein one CPU is occupied for the at least one downlink metric and at least one CPU is occupied for the at least one uplink metric.
64. The apparatus of clause 63, wherein one CPU is occupied for each of the at least one set of uplink panel IDs.
65. The apparatus of clause 63, wherein one CPU is occupied for all of the at least one set of uplink panel IDs.
66. The apparatus of clause 63, wherein one CPU is occupied for each uplink panel ID.
67. A non-transitory computer-readable medium storing computer executable code, the code when executed by a processor instructs the processor to:
receive channel state information (CSI) reference signals (RS) or synchronization signal blocks (SSB);
measure CSI metrics based on the CSI-RS or SSB, the CSI metrics including at least one downlink metric and at least one uplink metric for at least one set of uplink panel identifiers (IDs); and
transmit a joint CSI report including the at least one downlink metric, the at least one uplink metric, and the set of uplink panel IDs associated with the at least one uplink metric.
68. The non-transitory computer-readable medium of clause 67, further comprising code to transmit an indication of a capability to support CSI reporting for a maximum number of sets of uplink panel IDs.
69. The non-transitory computer-readable medium of clause 68, wherein the capability is a maximum number of sets of uplink panel IDs in one joint CSI report.
70. The non-transitory computer-readable medium of clause 68, wherein the capability is a maximum number of sets of uplink panel IDs in a single reporting instance that includes multiple CSI reports.
71. The non-transitory computer-readable medium of clause 68, wherein the capability is a maximum number of sets of uplink panel IDs in simultaneous CSI reports on all serving cells.
72. The non-transitory computer-readable medium of any of clauses 67-71, wherein measuring the CSI metrics based on the CSI-RS or SSB comprises determining that at least one CSI processing unit (CPU) is occupied for reporting the at least one uplink metric.
73. The non-transitory computer-readable medium of clause 72, wherein one CPU is occupied for the joint CSI report.
74. The non-transitory computer-readable medium of clause 72, wherein one CPU is occupied for the at least one downlink metric and at least one CPU is occupied for the at least one uplink metric.

75. The non-transitory computer-readable medium of clause 74, wherein one CPU is occupied for each of the at least one set of uplink panel IDs.

76. The non-transitory computer-readable medium of clause 74, wherein one CPU is occupied for all of the at least one set of uplink panel IDs.

77. The non-transitory computer-readable medium of clause 74, wherein one CPU is occupied for each uplink panel ID.

78. A non-transitory computer-readable medium storing computer executable code, the code when executed by a processor instructs the processor to:

configure a user equipment (UE) to measure channel state information (CSI) metrics based on CSI reference signals (RS) or synchronization signal blocks (SSB), the CSI metrics including at least one downlink metric and at least one uplink metric for at least one set of uplink panel identifiers (IDs);

transmit the CSI-RS or SSB; and receive a joint CSI report from the UE including the at least one downlink metric, the at least one uplink metric, and the at least one set of uplink panel IDs associated with the at least one uplink metric.

79. The non-transitory computer-readable medium of clause 78, further comprising code to receive an indication of a capability of the UE to support CSI reporting for a maximum number of sets of uplink panel IDs.

80. The non-transitory computer-readable medium of clause 79, wherein the capability is a maximum number of sets of uplink panel IDs in one joint CSI report.

81. The non-transitory computer-readable medium of clause 79, wherein the capability is a maximum number of sets of uplink panel IDs in a single reporting instance that includes multiple CSI reports.

82. The non-transitory computer-readable medium of clause 79, wherein the capability is a maximum number of sets of uplink panel IDs in simultaneous CSI reports on all serving cells.

83. The non-transitory computer-readable medium of any of clauses 78-82, further comprising code to determine that at least one CSI processing unit (CPU) is occupied for reporting the at least one uplink metric.

84. The non-transitory computer-readable medium of clause 83, wherein one CPU is occupied for the joint CSI report.

85. The non-transitory computer-readable medium of clause 83 wherein one CPU is occupied for the at least one downlink metric and at least one CPU is occupied for the at least one uplink metric.

86. The non-transitory computer-readable medium of clause 85, wherein one CPU is occupied for each of the at least one set of uplink panel IDs.

87. The non-transitory computer-readable medium of clause 85, wherein one CPU is occupied for all of the at least one set of uplink panel IDs.

88. The non-transitory computer-readable medium of clause 85, wherein one CPU is occupied for each uplink panel ID.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:

determining a number of channel state information (CSI) processing units that are occupied for joint CSI reporting of at least one downlink metric and at least one uplink metric, wherein a first CSI processing unit is occupied for the at least one downlink metric and a second CSI processing unit is occupied for the at least one uplink metric;

transmitting an indication of a capability to support the joint CSI reporting of the at least one downlink metric and the at least one uplink metric for a maximum number of sets of uplink panel identifiers (IDs), wherein the capability is a maximum number of sets of uplink panel IDs in one or more CSI reports, and wherein the capability is based on the number of CSI processing units;

receiving channel state information (CSI) reference signals (RS) or synchronization signal blocks (SSB);

measuring CSI metrics based on the CSI-RS or SSB, the CSI metrics including the at least one downlink metric and the at least one uplink metric for at least one set of uplink panel IDs; and transmitting a joint CSI report including the at least one downlink metric, the at least one uplink metric, and the set of uplink panel IDs associated with the at least one uplink metric.

2. The method of claim 1, wherein the capability is a maximum number of sets of uplink panel IDs in one joint CSI report.

3. The method of claim 1, wherein the capability is a maximum number of sets of uplink panel IDs in a single reporting instance that includes multiple CSI reports.

4. The method of claim 1, wherein the capability is a maximum number of sets of uplink panel IDs in simultaneous CSI reports on all serving cells.

5. A method of wireless communication, comprising:

determining a number of channel state information (CSI) processing units that are occupied for joint CSI reporting of at least one downlink metric and at least one uplink metric, wherein a first CSI processing unit is occupied for the at least one downlink metric and a second CSI processing unit is occupied for the at least one uplink metric;

receiving an indication of a capability of a user equipment (UE) to support joint CSI reporting of the at least one downlink metric and the at least one uplink metric for a maximum number of sets of uplink panel identifiers (IDs), wherein the capability is a maximum number of sets of uplink panel IDs in one or more CSI reports;

configuring the UE to measure channel state information (CSI) metrics based on CSI reference signals (RS) or synchronization signal blocks (SSB), the CSI metrics including the at least one downlink metric and the at least one uplink metric for at least one set of uplink panel IDs, wherein a number of the at least one set of uplink panel IDs is based on the number of CSI processing units that are occupied for joint CSI reporting and the maximum number of sets of uplink panel IDs in one or more CSI reports;

transmitting the CSI-RS or SSB; and receiving a joint CSI report from the UE including the at least one downlink metric, the at least one uplink metric, and the at least one set of uplink panel IDs associated with the at least one uplink metric.

6. The method of claim 5, wherein the capability is a maximum number of sets of uplink panel IDs in one joint CSI report.

7. The method of claim 5, wherein the capability is a maximum number of sets of uplink panel IDs in a single reporting instance that includes multiple CSI reports.

8. The method of claim 5, wherein the capability is a maximum number of sets of uplink panel IDs in simultaneous CSI reports on all serving cells.

9. An apparatus for wireless communication, comprising one or more memories coupled to one or more processors, wherein the one or more processors are configured to cause the apparatus to:

determine a number of channel state information (CSI) processing units that are occupied for joint CSI reporting of at least one downlink metric and at least one uplink metric, wherein a first CSI processing unit is occupied for the at least one downlink metric and a second CSI processing unit is occupied for the at least one uplink metric;

transmit an indication of a capability to support the joint CSI reporting of the at least one downlink metric and the at least one uplink metric for a maximum number of sets of uplink panel identifiers (IDs), wherein the capability is a maximum number of sets of uplink panel IDs in one or more CSI reports, and wherein the capability is based on the number of CSI processing units;

receive channel state information (CSI) reference signals (RS) or synchronization signal blocks (SSB);

measure CSI metrics based on the CSI-RS or SSB, the CSI metrics including the at least one downlink metric and the at least one uplink metric for at least one set of uplink panel ID; and transmit a joint CSI report including the at least one downlink metric, the at least one uplink metric, and the set of uplink panel IDs associated with the at least one uplink metric.

10. The apparatus of claim 9, wherein the capability is a maximum number of sets of uplink panel IDs in one joint CSI report.

11. The apparatus of claim 9, wherein the capability is a maximum number of sets of uplink panel IDs in a single reporting instance that includes multiple CSI reports.

12. The apparatus of claim 9, wherein the capability is a maximum number of sets of uplink panel IDs in simultaneous CSI reports on all serving cells.

13. An apparatus for wireless communication, comprising one or more memories coupled to one or more processors, wherein the one or more processors are configured to cause the apparatus to:

determine a number of channel state information (CSI) processing units that are occupied for joint CSI reporting of at least one downlink metric and at least one uplink metric, wherein a first CSI processing unit is occupied for the at least one downlink metric and a second CSI processing unit is occupied for the at least one uplink metric;

receive an indication of a capability of a user equipment (UE) to support joint CSI reporting of the at least one downlink metric and the at least one uplink metric for a maximum number of sets of uplink panel identifiers (IDs), wherein the capability is a maximum number of sets of uplink panel IDs in one or more CSI reports;

configure the UE to measure channel state information (CSI) metrics based on CSI reference signals (RS) or synchronization signal blocks (SSB), the CSI metrics including the at least one downlink metric and the at least one uplink metric for at least one set of uplink panel IDs, wherein a number of the at least one set of uplink panel IDs is based on the number of CSI processing units that are occupied for joint CSI reporting and the maximum number of sets of uplink panel IDs in one or more CSI reports;

transmit the CSI-RS or SSB; and receive a joint CSI report from the UE including the at least one downlink metric, the at least one uplink metric, and the at least one set of uplink panel IDs associated with the at least one uplink metric.

14. The apparatus of claim 13, wherein the capability is a maximum number of sets of uplink panel IDs in one joint CSI report.

15. The apparatus of claim 13, wherein the capability is a maximum number of sets of uplink panel IDs in a single reporting instance that includes multiple CSI reports.

16. The apparatus of claim 13, wherein the capability is a maximum number of sets of uplink panel IDs in simultaneous CSI reports on all serving cells.

17. The apparatus of claim 13, wherein one CPU is occupied for each of the at least one set of uplink panel IDs.

18. The method of claim 1, wherein one CPU is occupied for each of the at least one set of uplink panel IDs.

* * * * *